G. W. BRISTOW & G. O. DOTY.
PLOW.
APPLICATION FILED SEPT. 30, 1908.
943,859.
Patented Dec. 21, 1909.
3 SHEETS—SHEET 1.
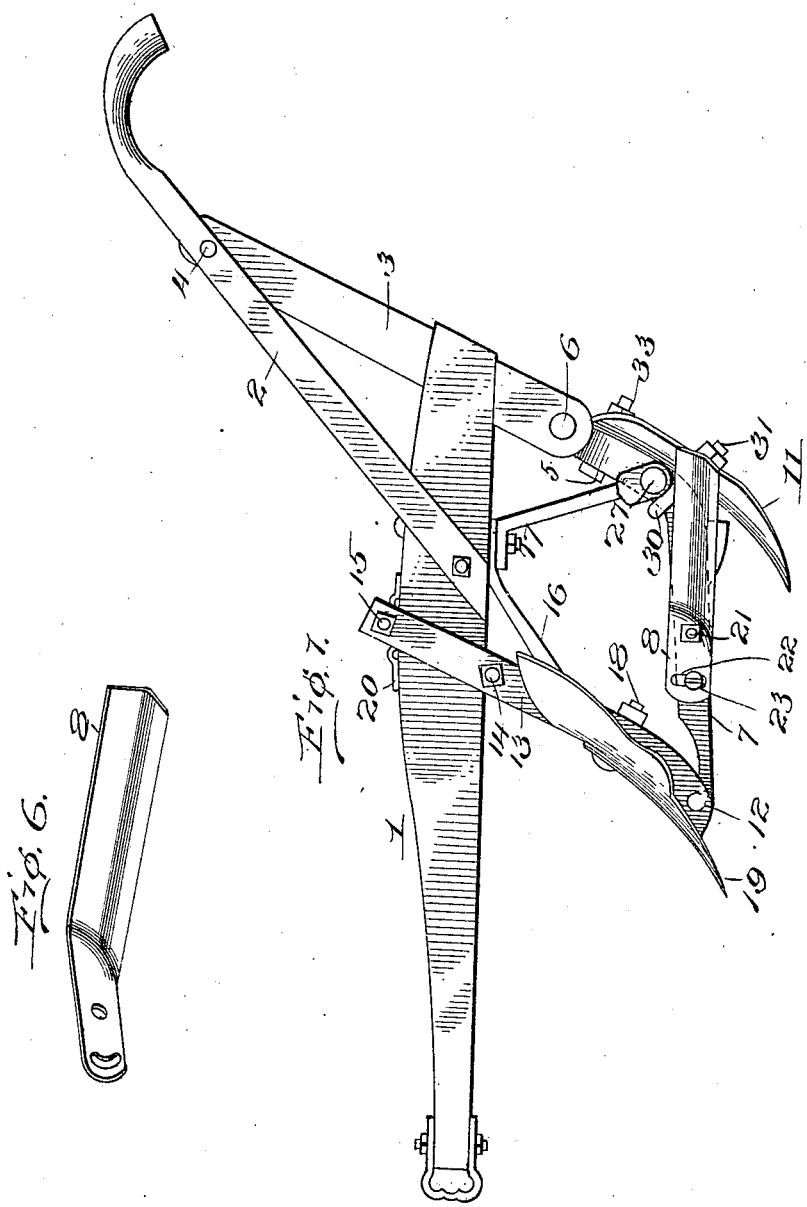

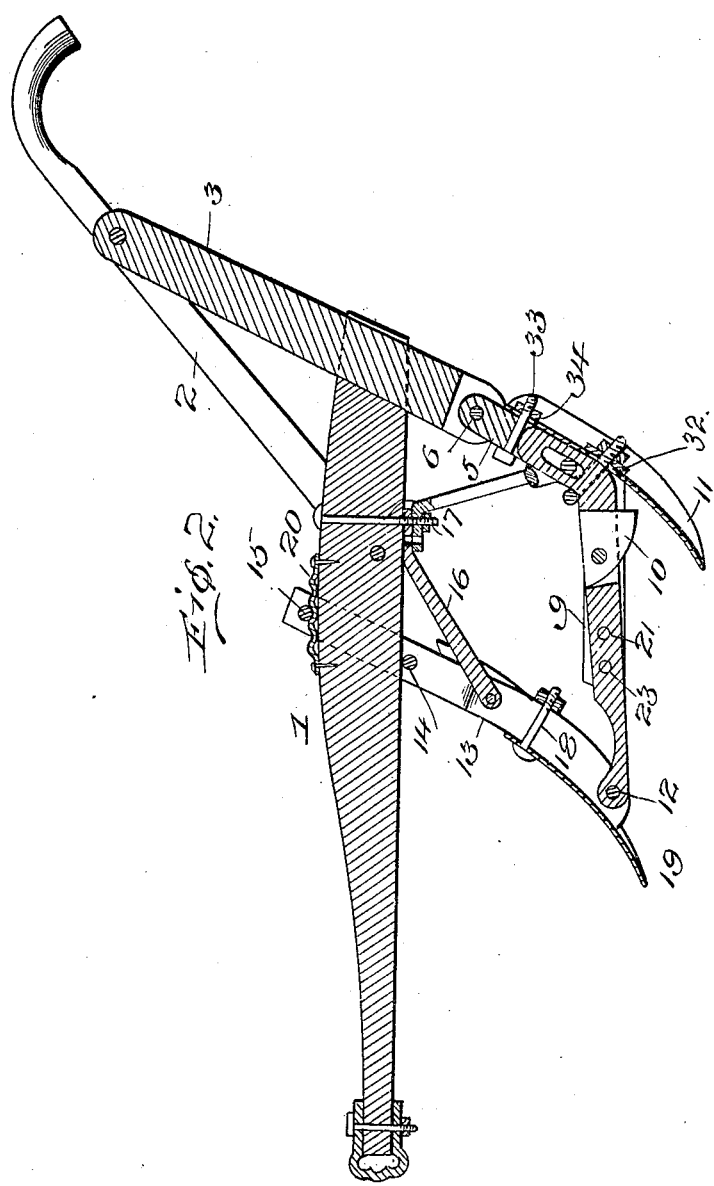

G. W. BRISTOW & G. O. DOTY.
PLOW.
APPLICATION FILED SEPT. 30, 1908.
943,859.
Patented Dec. 21, 1909.
3 SHEETS—SHEET 3.
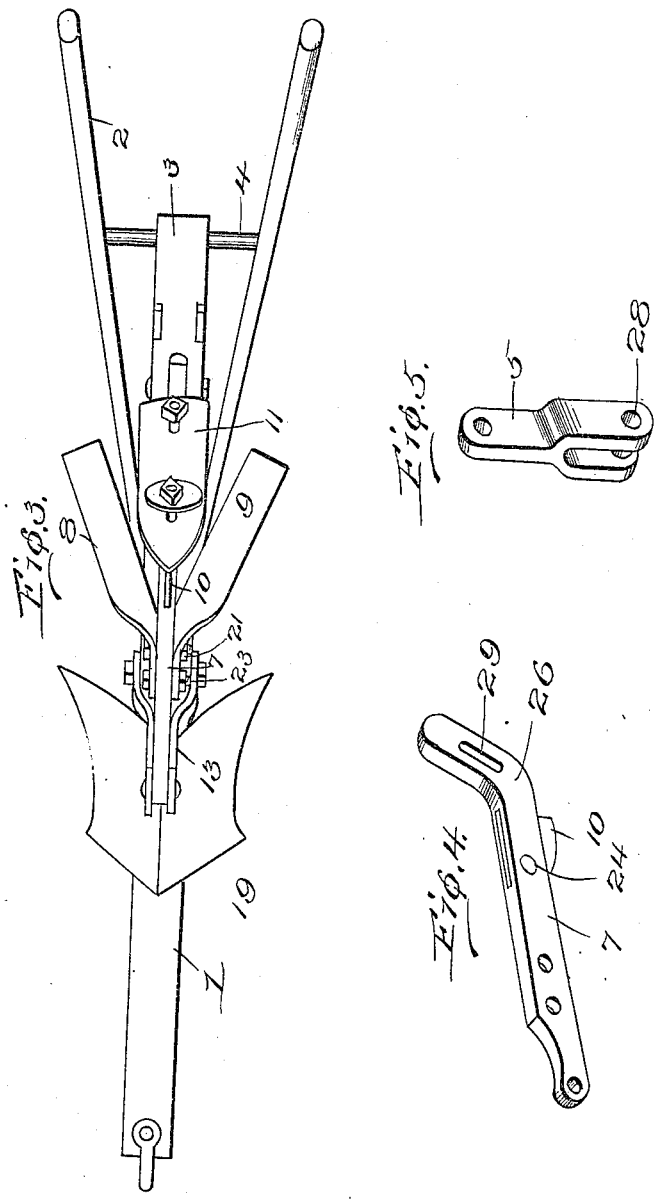
Witnesses
Inventors
George W. Bristow
George O. Doty
By Beall & Fenwick
their Attorney

UNITED STATES PATENT OFFICE.

GEORGE W. BRISTOW AND GEORGE O. DOTY, OF GUNTOWN, MISSISSIPPI.

PLOW.

943,859.  Specification of Letters Patent.  Patented Dec. 21, 1909.

Application filed September 30, 1908. Serial No. 455,402.

*To all whom it may concern:*

Be it known that we, GEORGE W. BRISTOW and GEORGE O. DOTY, citizens of the United States, residing at Guntown, in the county of Lee and State of Mississippi, have invented certain new and useful Improvements in Plows, of which the following is a specification.

This invention relates to improvements in plows, and particularly to plows having subsoiling attachments, and has for an object the provision of the combination of a plow proper, sweeps, and a subsoiler arranged in such coöperative relationship to each other as to present improved means for cultivating the soil.

Another object in view is the provision of means for adjusting the angle of the plow, and independent means for adjusting the depth of the subsoiler so as to produce any desired relationship between the subsoiler and the plow.

A further object of the invention is the provision of the plows constructed on the order of a burster behind which is arranged adjustable heel sweeps and in line with the center of the plow a rudder, and also an adjustable subsoiler, the plow sweeps, rudder, and subsoiler being arranged so each will act in an independent capacity but in such a relationship as to work the soil in a predetermined manner for properly mixing the same at one operation.

With these and other objects in view the invention comprises certain novel constructions, combinations and arrangement of parts as will be hereinafter more fully described and claimed.

In the accompanying drawings: Figure 1 is a side elevation of a plow embodying the features of the invention. Fig. 2 is a longitudinal central section through the structure shown in Fig. 1. Fig. 3 is a bottom plan view of the structure shown in Fig. 1. Fig. 4 is a detail perspective view of an adjustably mounted runner. Fig. 5 is an enlarged detail perspective view of a bifurcated link or clip. Fig. 6 is a detail perspective view of one of the sweeps.

In plows it is desirable to turn over the soil properly and at the same time make as straight a furrow as possible. In addition in plows that are used for turning over or bursting the soil and cultivating the same at the same time it is desirable to arrange means for guiding the plow and the various subsoiling devices.

In the present invention the objects desired as set forth are secured and others in addition in such a manner that no complicated structure is presented, but on the contrary details that are easily adjusted and arranged to act as indicated. In producing a device of this character we have arranged a plow with an ordinary beam which may be of any desired construction, either of wood or iron, to which is secured preferably by bolts a plow standard that carries an adjustable plow in the lower end thereof which may be of the bursting or turning type of plow. In using the plow for cultivating purposes a bursting plow is preferably used, and may be adjusted to any desired depth. Pivotally mounted to the standard of the bursting plow is an adjustable runner for carrying sweeps and a subsoiler. The sweeps are adjustably mounted so as to act in any desired relationship and to only enter the soil to a desired depth. Back of the sweeps and positioned centrally therebetween is a subsoiler that may be adjusted for various depths for additionally stirring up the soil. In order to assist in guiding the plow a rudder is positioned in front of the subsoiler that may be of any desired size. By thus arranging the plow, subsoiler, sweeps, and rudder and means for supporting the same properly in position a complete cultivator or plow is presented that breaks the soil and then stirs the same to the proper condition for securing the best results.

In the accompanying drawings is disclosed a plow embodying a preferred form of the invention in which 1 indicates the beam of the plow, and 2 suitable handles secured thereto. Secured to the beam 2 is a bracing member 3 that also is connected with the handles 2 by a cross member 4. This bracing member extends downward past the rear end of beam 1 and is bifurcated at its lower end for receiving a bifurcated link or clip 5. Bifurcated link or clip 5 is pivotally mounted in the lower end of member 3 and is held in place preferably by a bolt 6. The bifurcated link or clip 5 is arranged so that the ends thereof may have a slight movement for clamping the member to a runner 7 by means of bolt 27 hereinafter more fully described. If desired the bifurcated portion of member 5 may be made rigid, and in such instance slot 29 in runner 7 will be omitted and simply an aperture passed therethrough for accommodating bolt 27. Connected with bifurcated member 5 is a pivotally mounted runner 7 that is adapted to carry sweeps 8 and 9, a rudder 10, and a subsoiling plow or shovel 11. Runner 7 is pivotally mounted at 12 to the main plow standard 13 which in turn is clamped to beam 1 by bolts 14 and 15. Standard 13 is made in two parts as clearly seen in Fig. 3, and is adapted to have the respective parts pass upon the opposite sides of beam 1 in order that bolts 14 and 15 may clamp the runner of the beam. Pivotally mounted runner 7 has the end thereof positioned between the lower ends of the respective parts of standard 13, and consequently holds the same apart. A brace 16 that is bolted or otherwise firmly secured, as by bolt 17, to beam 1 is pivotally mounted between the respective parts of standard 13 for brushing the runner and for holding the same at a proper angle. The brace 16 may be provided with any desired number of apertures through which bolt 17 may pass. Positioned between brace 16 and runner 7 is a retaining bolt 18 that is adapted to pass through the main plow 19 and clamp the same in position upon standard 13. Bolt 18 may be moved along standard 13 and also plow 19 may be moved correspondingly so as to adjust the plow to various depths. Secured to beam 1 is a retaining strip 20 which is provided with corrugations for receiving bolt 15 in order to prevent any slipping action thereof.

The sweeps 8 and 9 are pivotally mounted upon runner 7 by means of bolt 21 and are formed with slots 22 through which a bolt 23 passes. When it is desired to adjust the sweeps 8 and 9 bolt 23 is loosened and the sweeps adjusted to any desired angle, and then the bolt again tightened. At the rear of sweeps 8 and 9 is arranged a rudder 10 which is positioned in a slot formed in runner 7. The rudder 10 is preferably held in place by a rivet 24 and by the walls of the slot through which the rudder passes.

Rudder 10 is of particular importance when the plow is used as an ordinary middle burster for assisting in guiding the plow. When the sweeps 8 and 9 are removed and the subsoiler 11 is removed the plow has a tendency to wabble and move from side to side when running a furrow so that by the addition of rudder 10 a steering or guiding means is provided that materially assists in directing the movement of the plow. When the subsoiler 11 is placed in position as shown in the drawing the rudder may be dispensed with if desired, though ordinarily the same is left in position as it is of no disadvantage even though accomplishing no advantage at that time.

The runner 7 is bent at 26 to extend in alinement with member 3 and is adapted to pass between the bifurcations of member 5 and be held in place by a bolt 27 that passes through apertures 28 in the bifurcated member 5, and through slot 29 formed in the end of runner 7 and clamping the bifurcations of member 5 to runner 7. By forming a slot as 29 in runner 7 the runner may receive an adjustment if so desired. Surrounding the runner 7 at the bent portion 26 is an eye 30 of bolt 31. Bolt 31 is adapted to pass through a slot 32 in subsoiler 11, the slot in the subsoiler permitting an adjustment thereof. In order to positively hold the subsoiler in position a second bolt 33 passes through a slot 34 positioned near the upper end of the subsoiler. The bolt 33 passes through the bifurcations of member 5 and above the end of the turned up part of runner 7 as clearly seen in Fig. 2. The sweeps, rudder, and subsoiler may all be bodily adjusted vertically by moving or adjusting runner 7 or each may be independently adjusted as heretofore described.

What we claim is:

1. In a plow the combination with a beam and rear bars, of a bifurcated clip pivotally connected with the lower end of the bars, a standard, a runner connected with the standard and having an upturned slotted terminal disposed between the bifurcated members of the clip and sweeps adjustably secured to the runner, the forward portion of the sweeps being flat and deflected from the rear portion and the latter portion being V-shaped in cross-section.

2. In a plow, the combination with a beam and rear bars of a bifurcated clip pivotally connected with the lower end of the bars, a standard, a runner connected with the standard and having an upturned slotted terminal disposed between the bifurcated members of the clip, sweeps adjustably carried by the runner, the forward portion of the sweeps adjustably carried by the runner, the forward portion of the sweeps being flat and deflected from the rear portion, and the latter portion being V-shaped in cross section.

In testimony whereof we affix our signatures in presence of two witnesses.

GEORGE W. BRISTOW.
GEORGE O. DOTY.

Witnesses:
L. C. RHODES,
D. G. GREENE.